C. E. SOELKEY.
Chimney Cowl.
No. 200,002. Patented Feb. 5, 1878.
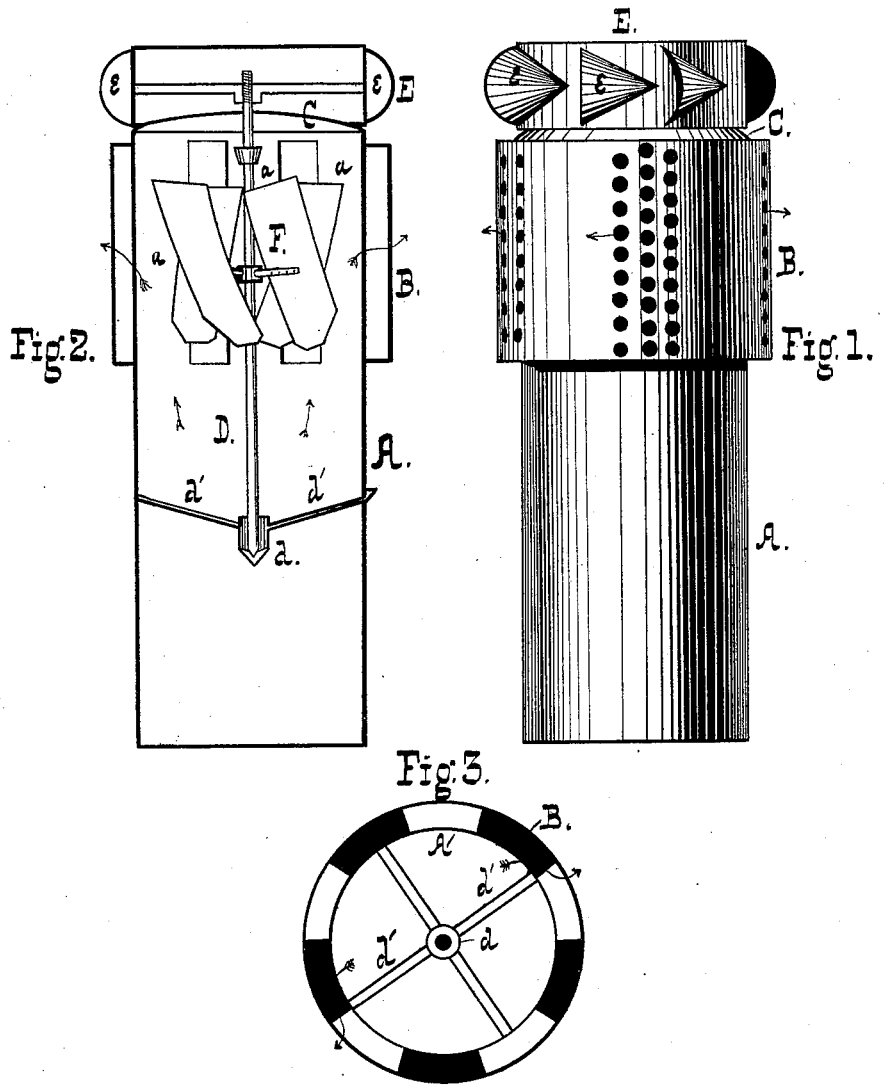
WITNESSES,
INVENTOR,
Christian E. Soelkey
BY
R. W. Williams
ATTORNEY.

UNITED STATES PATENT OFFICE.

CHRISTIAN E. SOELKEY, OF BALTIMORE, MARYLAND.

IMPROVEMENT IN CHIMNEY-COWLS.

Specification forming part of Letters Patent No. 200,002, dated February 5, 1878; application filed January 22, 1878.

*To all whom it may concern:*

Be it known that I, CHRISTIAN E. SOELKEY, of Baltimore city, State of Maryland, have invented certain new and useful Improvements in Chimney-Cowls; and I hereby declare the same to be fully, clearly, and exactly described as follows, reference being had to the accompanying drawings, in which—

Figure 1 represents my improved chimney-cowl in side elevation; Fig. 2, a vertical sectional view, and Fig. 3 a horizontal sectional view, of the same.

This invention relates to that class of devices in use for preventing the obstruction of the draft of chimneys by the wind; and it consists in a cowl possessing certain features of novelty, as hereinafter described and claimed.

The device consists of a cylinder, A, which is suitably mounted upon the chimney, and is provided at its upper end with a drum, B, perforated as shown. Within the drum the cylinder is cut away at intervals, thus forming a series of slats, a, and intermediate openings leading into the drum.

The cylinder is closed at the top by a cover, C, through which passes a shaft, D, which latter has its bearing in a cup, d, in the lower portion of the cylinder. Upon the shaft D is mounted, above the cover C, a wheel, E, provided upon its periphery with a series of cone-shaped cups, e e, similar to those of an ordinary anemometer.

Within that part of the cylinder inclosed by the drum B the shaft D carries a series of propeller-blades, F, so inclined that the motion of the wheel E by the wind will cause an upward current within the cylinder A and out through the openings at its upper end.

The lower bearing or cup d is attached to the walls of the cylinder by means of arms d' d', one of which is made tubular and communicates with the exterior of the cylinder, furnishing a ready and effective means for applying oil to the bearing.

From the foregoing description of the construction of the device, its operation is evident.

To briefly describe it, however, the wheel E is caused to revolve by the pressure of the wind upon its buckets, and the consequent revolution of the propeller-blades causes a strong upward draft within the cylinder.

The smoke is driven out, as shown by the arrows, through the openings at either end of the drum, as well as through the perforations, except, of course, on the windward side of the cowl.

The propeller-wheel being completely isolated from the wheel E, the motion and operation of the former are not antagonized nor impaired by currents of air deflected from the latter, while the perforated drum inclosing the slatted end of the cylinder effectually prevents the access laterally of the wind, while still affording free and ample egress to leeward for the smoke and products of combustion.

Having thus described my invention, what I claim as new, and desire to secure by Letters Patent, is—

1. In a chimney-cowl, a duct for the products of combustion, provided with lateral openings, in combination with a propeller-wheel and a wind-wheel, the latter being separated by a plate, as set forth.

2. In a chimney-cowl, a central flue containing a propeller-wheel, and having lateral openings, the said flue being inclosed within a perforated drum, and surmounted by a wind-wheel, substantially as described.

3. In combination with the cylinder A, the drum B, propeller-wheel F, and wind-wheel E, arranged substantially as described.

4. In combination with the cylinder A, the shaft D, cup d, and arms d' d', one of which is made tubular and communicates with the exterior of the cylinder, substantially as described.

Witness my hand this 21st day of January, 1878.

CHRISTIAN E. SOELKEY.

Witnesses:
R. D. WILLIAMS,
DAVID G. WEEMS.